Patented Mar. 30, 1926.

1,578,943

UNITED STATES PATENT OFFICE.

EARL H. WELTZ, OF PENNS GROVE, NEW JERSEY, ASSIGNOR TO E. I. DU PONT DE NEMOURS & COMPANY, OF WILMINGTON, DELAWARE, A CORPORATION OF DELAWARE.

PROCESS OF MAKING NITRANISOLES.

No Drawing. Application filed September 17, 1920. Serial No. 410,979.

*To all whom it may concern:*

Be it known that I, EARL H. WELTZ, a citizen of the United States, and a resident of Penns Grove, in the county of Salem and State of New Jersey, have invented a certain new and useful Process of Making Nitranisoles, of which the following is a specification.

My invention relates to the production of nitranisoles, and consists essentially in condensing a nitrophenyl halide, such as nitrochlorobenzene, with methyl alcohol, preferably dilute, under pressure in the presence of an alkali such as sodium hydroxide.

In the preparation of nitranisoles from nitrochlorobenzene, methyl alcohol, and a caustic alkali, the main reaction is accompanied, under certain conditions, by side reactions such as reduction, which result in the formation of what are probably azo or azoxy compounds. These not only diminish the yield of the desired product, but also make necessary a separation of the desired product from the impurities.

I have discovered that the aforesaid side reactions, and especially reduction, may be largely avoided by carrying out the condensation under pressure, and by using dilute methyl alcohol, that is, an aqueous methyl alcohol solution containing, say, from about 10 to 25% of water. Not only is the yield of nitranisoles increased by proceeding in this manner, but a very great saving in time is effected, as compared with known processes.

The invention may be illustrated by the following example of the preparation of ortho-nitranisole.

0.28 to 0.30 parts caustic soda are dissolved in 3–6 parts of 80–90% methyl alcohol (10–20% water) and after the addition of one part of ortho-nitro-chlorobenzene, the autoclave is made air tight. The temperature is then raised to 105–110° C. and held for 4–12 hours, or until the reaction is finished.

The excess alcohol is distilled off and the nitranisole is drawn off after washing with hot water to remove the sodium chloride and nitrophenolates which are also formed in the reaction.

The reaction is preferably carried out in enameled or glass lined apparatus; iron may be used but in this case the product is usually larger than that prepared in the other apparatus and would probably have to be purified.

As examples of other nitranisoles which may be produced according to my process there may be mentioned para-nitranisole from para-nitrochlorobenzene, and dinitranisole from dinitrochlorobenzene.

Although the temperature is preferably maintained between 100 and 120° C., either a higher or lower temperature may be used without departing from my invention.

I claim:—

1. A process of making a nitranisole which comprises heating under pressure and at a temperature of from about 105 to 110° C. a nitrochlorobenzene and methyl alcohol in the presence of water and an alkali-metal hydroxide.

2. A process of making ortho-nitranisole which comprises heating under pressure, and at a temperature between 100 and 120° C., ortho-nitrochlorobenzene and an aqueous methyl alcohol solution containing from about 10 to 25% of water in the presence of sodium hydroxide.

3. The process of making ortho-nitranisole which comprises heating under pressure, and at a temperature between 100 and 120° C., one part of ortho-nitrochlorobenzene, three to six parts of methyl alcohol solution containing from 10 to 20% of water, and about three-tenths of a part of sodium hydroxide.

In testimony whereof I affix my signature.

EARL H. WELTZ.

Certificate of Correction.

It is hereby certified that in Letters Patent No. 1,578,943, granted March 30, 1926, upon the application of Earl H. Weltz, of Penns Grove, New Jersey, for an improvement in "Processes of Making Nitranisoles," an error appears in the printed specification requiring correction as follows: Page 1, line 55, for the word "larger" read *darker;* and that the said Letters Patent should be read with this correction therein that the same may conform to the record of the case in the Patent Office.

Signed and sealed this 27th day of April, A. D. 1926.

[SEAL]

M. J. MOORE,
*Acting Commissioner of Patents.*